United States Patent [19]

Lütze

[11] Patent Number: 4,886,531

[45] Date of Patent: Dec. 12, 1989

[54] AIR FILTER CASING OF AN INTERNAL COMBUSTION ENGINE

[75] Inventor: Norbert Lütze, Esslingen, Fed. Rep. of Germany

[73] Assignee: Daimler-Benz AG, Stuttgart, Fed. Rep. of Germany

[21] Appl. No.: 251,583

[22] Filed: Sep. 30, 1988

[30] Foreign Application Priority Data

Oct. 1, 1987 [DE] Fed. Rep. of Germany ....... 3733213

[51] Int. Cl.4 ....................... B01D 46/02; B01D 47/00

[52] U.S. Cl. ....................................... 55/244; 55/260; 55/320; 55/337; 261/119.1

[58] Field of Search ................. 55/255, 256, 259, 260, 55/320, 337, 244; 261/119.1

[56] References Cited

U.S. PATENT DOCUMENTS

| | | | |
|---|---|---|---|
| 2,138,153 | 11/1938 | Grisdale | 55/255 X |
| 2,198,189 | 4/1940 | Vokes | 55/255 |
| 3,686,833 | 8/1972 | Rush | 261/119.1 X |
| 4,087,263 | 5/1978 | Schönmann | 55/320 |
| 4,749,389 | 6/1988 | Worwag | 55/259 |

*Primary Examiner*—Charles Hart
*Attorney, Agent, or Firm*—Barnes & Thornburg

[57] ABSTRACT

An air filter casing of an internal combustion engine is described, having an unfiltered air chamber which receives the uncleaned intake air and is separated from a clean air chamber for receiving the cleaned intake air by way of a filter element. To prevent possible intake of larger quantitites of water in the event of heavy rainfall, there is provided in the clean air chamber a device for swirling water which settles at the bottom of the casing, the bottom end of which device has a minimum spacing from the bottom of the casing.

10 Claims, 1 Drawing Sheet

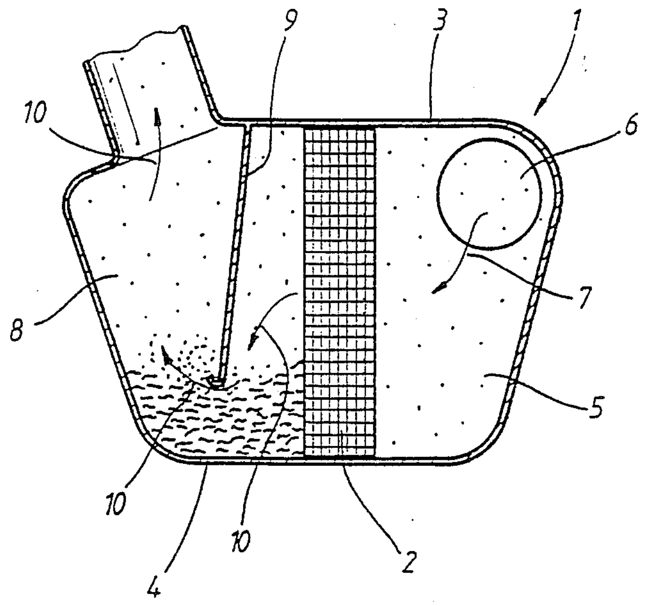
9
3
1
10
6
7
8
5
10
10
2
4

AIR FILTER CASING OF AN INTERNAL COMBUSTION ENGINE

BACKGROUND AND SUMMARY OF THE INVENTION

The invention relates to an air filter casing of an internal combustion engine which includes an air filter element dividing the interior of the casing into an unfiltered air chamber for receiving the uncleaned combustion air and a clean air chamber for receiving the cleaned combustion air.

With an air filter casing of this type, which is known from German Utility Model No. 19 81 035, there is provided at its clean air end, in the area of an angled intake tube which recycles the venting gases of the crankcase, a recess in the casing bottom with the aid of which recess the condensation water which may be entrained with the crankcase venting gases can be prevented from being aspirated by the internal combustion engine. However, with an unfavorable arrangement of the suction pipe on the unfiltered air side it must be expected during operation in relatively heavy rainfall that the water which is sucked in with the combustion air can settle after a certain time in the clean air portion of the air filter casing and collect there to such an extent that in the event of acceleration or deceleration a larger quantity of water can pass into the suction pipe and thus enter the combustion chamber of the internal combustion engine.

An air filter casing is also known from German published unexamined application (DOS) No. 31 30 782, at the bottom of which casing there is provided on the unfiltered air side a relatively costly valve for draining water from the air filter casing.

In the case of an air filter casing shown in German published unexamined application (DOS) No. 34 29 633, a controlled multiple deflection of the aspirated combustion air and consequently suppression of the intake noise are achieved by partitions attached to the upper part of the casing and to the casing bottom. However, this multiple deflection of the intake air has an adverse effect on the volumetric efficiency of the internal combustion engine.

A problem underlying the invention is therefore to create an air filter casing of the general type described above in which any water collected on the clean air side of the air filter casing can be kept to a minimum during operation in heavy rainfall without any appreciable adverse effect on volumetric efficiency.

This problem is solved in accordance with the invention by providing a device in the clean air chamber which starts from the upper part of the casing and ends in the area near to the bottom of the casing, for swirling water which settles at the bottom of the casing.

The device according to the invention which is arranged in the clean air chamber of the air filter casing ensures that even in the event of very small accumulations of water, the water swirls to such an extent because of the strong flow of intake air that negligibly small quantities of water are also aspirated continuously by the internal combustion engine and discharged again in the form of water vapor during the engine exhaust cycle.

Consequently, the water level established in the stationary state in the clean air chamber remains so low that aspiration of larger quantities of water which are critical in terms of damage to the internal combustion engine is excluded.

In especially preferred embodiments the water swirling device is constructed as a partition wall connected to the top and side walls of the casing and extending downward to a small spacing from the bottom casing wall. Certain preferred embodiments have the partition wall spaced by about 35 mm from the casing bottom wall and the bottom of the partition wall is rounded.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic side sectional view of an air filter casing arrangement constructed in accordance with a preferred embodiment of the invention.

BRIEF DESCRIPTION OF THE INVENTION

A filter element 2 is fitted in an air filter casing 1, the filter element extending between the upper part 3 and to the bottom 4 of the casing 1. This filter element 2 separates an unfiltered air chamber 5, in which the combustion air still contaminated by particles flows in (arrow 7) via the connection 7 during the induction phase, from a clean air chamber 8 into which the combustion air passes in a cleaned form after streaming through the filter element 2.

Attached to the upper part 3 of the casing 1 is a water swirling partition 9 which extends over the entire width of the casing 1 (perpendicular to the plane of the drawing) and projects into the clean air chamber 8 at an acute angle to the filter element 2 (with the spacing at the top between wall 9 and filter 2 greater than at the bottom of wall 4). The partition 9 creates a gas-tight and fluid-tight seal both on the upper part 3 of the casing and the two side walls which cannot be seen in the drawing. The distance between the bottom end of the partition 9 and the casing bottom 4 is approximately 35 mm. At this bottom end of the partition 9 a strong intake flow (arrows 10) now causes the swirling of water—naturally occurring usually only in the event of prolonged heavy rainfall—which passes from the unfiltered air chamber 5 into the clean air chamber 8 via the filter element 2. This swirled water is then finally aspirated by the internal combustion engine in uncritical quantities in the form of very small droplets. At the same time such a low water level is established in the stationary state on the clean air side 8 that direct aspiration of a larger quantity of water as a result of acceleration-induced "overspilling" into the intake port is impossible. In order to minimize the flow resistance at the bottom end of the partition 9, the latter end has a rounded shape.

In further development of the invention it is also contemplated for the partition to be arranged substantially parallel to the filter element.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Air filter casing arrangement for an internal combustion engine comprising:

an air filter casing having an upper part and a bottom;

a filter element which is adjacent to both the upper part of the casing and the bottom of the casing and which devides the volume occupied by the air filter casing into an unfiltered air chamber for receiving the uncleaned combustion air and a clean air chamber for receiving the cleaned combustion air; and a swirling device provided in the clean air chamber, which starts from the upper part of the casing and ends in the area near to the bottom of the casing to form an area of diminished cross section within the casing for creating a high velocity flow of intake air between a bottom side of the swirling device and a surface of water which settles at the bottom of the casing to cause a swirling of the water and a formation of very fine water droplets which mix with the intake air for aspiration by the internal combustion engine.

2. Air filter casing arrangement according to claim 1, wherein the swirling device is arranged parallel to the filter element.

3. Air filter casing arrangement according to claim 1, wherein the spacing between the swirling device and the filter element is less at the end on the side of the upper part of the casing than at the end on the casing bottom side.

4. Air filter casing arrangement according to claim 1, wherein the swirling device is in the form of a partition attached to the upper part of the casing.

5. Air filter casing arrangement according to claim 2, wherein the swirling device is in the form of a partition attached to the upper part of the casing.

6. Air filter casing arrangement according to claim 3, wherein the swirling device is in the form of a partition attached to the upper part of the casing.

7. Air filter casing arrangement according to claim 1, wherein the distance between the end of the swirling device on the casing bottom side and the casing bottom is approximately 35 mm.

8. Air filter casing arrangement according to claim 2, wherein the distance between the end of the swirling device on the casing bottom side and the casing bottom is approximately 35 mm.

9. Air filter casing arrangement according to claim 3, wherein the distance between the end of the swirling device on the casing bottom side and the casing bottom is approximately 35 mm.

10. Air filter casing arrangement according to claim 4, wherein the distance between the end of the swirling device on the casing bottom side and the casing bottom is approximately 35 mm.

* * * * *